(12) United States Patent
Imai et al.

(10) Patent No.: US 8,289,461 B2
(45) Date of Patent: Oct. 16, 2012

(54) LIQUID CRYSTAL DISPLAY DEVICE

(75) Inventors: Hajime Imai, Osaka (JP); Hitoshi Matsumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 556 days.

(21) Appl. No.: 12/523,935

(22) PCT Filed: Dec. 6, 2007

(86) PCT No.: PCT/JP2007/073557
§ 371 (c)(1),
(2), (4) Date: Jul. 21, 2009

(87) PCT Pub. No.: WO2008/090682
PCT Pub. Date: Jul. 31, 2008

(65) Prior Publication Data
US 2010/0045885 A1    Feb. 25, 2010

(30) Foreign Application Priority Data
Jan. 24, 2007   (JP) .................................. 2007-013654

(51) Int. Cl.
*G02F 1/1343* (2006.01)
*G02F 1/1335* (2006.01)

(52) U.S. Cl. ............................ 349/39; 349/113; 349/141

(58) Field of Classification Search .................... 349/39, 349/113, 141
See application file for complete search history.

(56) References Cited

U.S. PATENT DOCUMENTS

| 4,345,249 | A | 8/1982 | Togashi |
| 4,519,678 | A | 5/1985 | Komatsubara et al. |
| 5,408,345 | A | 4/1995 | Mitsui et al. |
| 5,418,635 | A | 5/1995 | Mitsui et al. |
| 5,508,834 | A | 4/1996 | Yamada et al. |
| 5,811,835 | A | 9/1998 | Seiki et al. |
| 6,104,460 | A | 8/2000 | Abe et al. |
| 6,154,264 | A | 11/2000 | Koide et al. |
| 6,208,395 | B1 | 3/2001 | Kanoh et al. |
| 6,287,899 | B1 | 9/2001 | Park et al. |

(Continued)

FOREIGN PATENT DOCUMENTS
EP     1 744 204 A1    1/2007

(Continued)

OTHER PUBLICATIONS

International Search Report mailed Aug. 21, 2007 in PCT application PCT/JP 2007/061632.

(Continued)

*Primary Examiner* — Huyen Ngo

(74) *Attorney, Agent, or Firm* — Nixon & Vanderhye P.C.

(57) ABSTRACT

A transflective-type liquid crystal display device with a high image quality which has a high aperture ratio and an excellent efficiency of utility of reflected light is provided at low cost. A liquid crystal display device according to the present invention is a liquid crystal display device having a transistor and a reflection section in each of a plurality of pixels; the reflection section includes a metal layer, an insulating layer formed on the metal layer, a semiconductor layer formed on the insulating layer, and a reflective layer formed on the semiconductor layer; a plurality of recesses are formed on the surface of the reflective layer; a storage capacitor is formed between at least a portion of the metal layer and at least a portion of the reflective layer; and at least one of the metal layer and the reflective layer includes two portions which are electrically isolated from each other.

16 Claims, 9 Drawing Sheets

U.S. PATENT DOCUMENTS

| | | |
|---|---|---|
| 6,330,047 B1 | 12/2001 | Kubo et al. |
| 6,407,784 B1 | 6/2002 | Kamou et al. |
| 6,468,822 B2 | 10/2002 | Maeda et al. |
| 6,573,127 B2 | 6/2003 | Seo |
| 6,661,488 B1 | 12/2003 | Takeda et al. |
| 6,710,825 B2 | 3/2004 | Kubo et al. |
| 6,747,289 B2 | 6/2004 | Yamazaki et al. |
| 6,771,346 B2 | 8/2004 | Sugimoto et al. |
| 6,839,107 B2 | 1/2005 | Kobashi |
| 6,839,108 B1 | 1/2005 | Hirakata et al. |
| 6,873,384 B2 | 3/2005 | Yamanaka et al. |
| 6,891,586 B2 | 5/2005 | Anno et al. |
| 6,900,084 B1 | 5/2005 | Yamazaki |
| 6,967,702 B2 | 11/2005 | Ishii et al. |
| 6,992,718 B1 | 1/2006 | Takahara |
| 7,102,712 B2 | 9/2006 | Anno et al. |
| 7,375,781 B2 | 5/2008 | Kubo |
| 7,525,614 B2 | 4/2009 | Jeong et al. |
| 7,554,631 B2 | 6/2009 | Tashiro et al. |
| 7,768,603 B2 | 8/2010 | Tasaka et al. |
| 2002/0018161 A1 | 2/2002 | Yamanaka et al. |
| 2002/0022364 A1 | 2/2002 | Hatta et al. |
| 2002/0054259 A1 | 5/2002 | Funahata et al. |
| 2002/0054269 A1 | 5/2002 | Maeda et al. |
| 2002/0080320 A1 | 6/2002 | Suzuki et al. |
| 2002/0149728 A1 | 10/2002 | Ogishima et al. |
| 2003/0012005 A1 | 1/2003 | Ito et al. |
| 2003/0020853 A1* | 1/2003 | Park et al. ............... 349/113 |
| 2003/0030768 A1* | 2/2003 | Sakamoto et al. ........ 349/113 |
| 2003/0089949 A1 | 5/2003 | Lin et al. |
| 2003/0112213 A1 | 6/2003 | Noguchi et al. |
| 2003/0142255 A1 | 7/2003 | Ishii et al. |
| 2003/0186478 A1 | 10/2003 | Morita et al. |
| 2003/0218664 A1 | 11/2003 | Sakamoto et al. |
| 2003/0231267 A1 | 12/2003 | Murai et al. |
| 2004/0021810 A1 | 2/2004 | Kawaguri et al. |
| 2004/0027702 A1 | 2/2004 | Matsushita et al. |
| 2005/0078242 A1* | 4/2005 | Park et al. ............... 349/113 |
| 2005/0122452 A1 | 6/2005 | Yoshida et al. |
| 2005/0190322 A1 | 9/2005 | Okabe et al. |
| 2005/0205870 A1 | 9/2005 | Yamazaki |
| 2005/0219451 A1* | 10/2005 | Masutani et al. ......... 349/141 |
| 2005/0270447 A1* | 12/2005 | Tasaka et al. ............ 349/113 |
| 2006/0055852 A1 | 3/2006 | Yoshida et al. |
| 2006/0114379 A1* | 6/2006 | Nagayama et al. ....... 349/113 |
| 2007/0001171 A1 | 1/2007 | Yamazaki |
| 2007/0146591 A1 | 6/2007 | Kimura et al. |
| 2007/0291200 A1 | 12/2007 | Tashiro et al. |
| 2008/0002079 A1 | 1/2008 | Kimura |
| 2009/0185119 A1 | 7/2009 | Kikuchi et al. |
| 2009/0195740 A1 | 8/2009 | Imai et al. |
| 2010/0014031 A1 | 1/2010 | Kikuchi et al. |
| 2010/0053517 A1 | 3/2010 | Imai et al. |
| 2010/0118238 A1 | 5/2010 | Shimada et al. |
| 2010/0182527 A1 | 7/2010 | Kikuchi et al. |
| 2010/0315578 A1 | 12/2010 | Hara et al. |

FOREIGN PATENT DOCUMENTS

| | | |
|---|---|---|
| JP | 63-296004 | 12/1988 |
| JP | 02-149802 | 6/1990 |
| JP | 4-372934 | 12/1992 |
| JP | 5-333328 | 12/1993 |
| JP | 6-331831 | 12/1994 |
| JP | 8-190089 | 7/1996 |
| JP | 9-54318 A | 2/1997 |
| JP | 10-325953 | 12/1998 |
| JP | 11-109390 | 4/1999 |
| JP | 11-237625 A | 8/1999 |
| JP | 11-295697 | 10/1999 |
| JP | 11-337961 | 12/1999 |
| JP | 2000-010124 | 1/2000 |
| JP | 2000-208773 A | 7/2000 |
| JP | 2000-329906 | 11/2000 |
| JP | 2001-201619 | 7/2001 |
| JP | 2001-337323 | 12/2001 |
| JP | 2002-236283 | 8/2002 |
| JP | 2003-297850 A | 10/2003 |
| JP | 2004-258366 | 9/2004 |
| JP | 2004-264653 | 9/2004 |
| JP | 2004-325503 | 11/2004 |
| JP | 2005-157105 A | 6/2005 |
| JP | 2005-195733 | 7/2005 |
| JP | 2005-208553 | 8/2005 |
| JP | 2005-313638 | 11/2005 |
| JP | 2006-098525 A | 4/2006 |
| JP | 2006-184673 | 7/2006 |
| JP | 2006-220711 | 8/2006 |
| JP | 2006-220922 | 8/2006 |
| JP | 2007-101843 | 4/2007 |
| JP | 2007-329099 | 12/2007 |
| JP | 2008-242307 A | 10/2008 |

OTHER PUBLICATIONS

English International Preliminary Report on Patentability mailed Jan. 29, 2009 in PCT Application No. PCT/JP2007/061632.

U.S. Notice of Allowance mailed Mar. 23, 2011 in U.S. Appl. No. 12/446,099.

International Search Report for PCT/JP2007/070160, mailed Nov. 27, 2007.

Supplementary EP Search Report mailed Sep. 23, 2010 in EP application 07806943.2.

U.S. Office Action mailed Aug. 3, 2011 in U.S. Appl. No. 12/446,071.

International Search Report for PCT/JP2007/067511, mailed Oct. 9, 2007.

International Search Report for PCT/JP2007/070829, mailed Nov. 27, 2007.

English translation of the International Preliminary Report on Patentability mailed Jun. 25, 2009 in PCT Application No. PCT/JP2007/070829.

U.S. Office Action mailed Aug. 5, 2011 in U.S. Appl. No. 12/518,719.

Restriction Requirement mailed Jun. 2, 2011 in U.S. Appl. No. 12/518,719.

International Search Report mailed Jan. 29, 2008 in PCT application PCT/JP 2007/073787.

International Search Report mailed Apr. 8, 2008 in PCT application PCT/JP/2007/075147.

English translation of International Preliminary Report on Patentability mailed Apr. 30, 2009 in corresponding PCT Application No. PCT/JP2007/070160.

English translation of International Preliminary Report on Patentability mailed Apr. 30, 2009 in corresponding PCT Application No. PCT/JP2007/067511.

English translation of the International Preliminary Report on Patentability mailed Aug. 13, 2009 in PCT Application No. PCT/JP2007/073787.

English International Preliminary Report on Patentability mailed Jan. 21, 2010 in PCT Application No. PCT/JP2008/001353.

English International Preliminary Report on Patentability mailed Oct. 22, 2009 in PCT Application No. PCT/JP2007/075147.

Supplementary EP Search Report mailed Dec. 17, 2010 in EP application 07860369.3.

English International Preliminary Report on Patentability mailed Nov. 27, 2008 in PCT Application No. PCT/JP2007/057674.

International Search Report mailed Jul. 8, 2008 in PCT application PCT/JP2008/001353.

International Search Report mailed Jul. 3, 2007 in PCT application PCT/JP2007/057674.

International Search Report mailed Jul. 3, 2007 in PCT application PCT/JP2007/057675.

English International Preliminary Report on Patentability mailed Nov. 27, 2008 in PCT Application No. PCT/JP2007/057675.

English translation of the International Preliminary Report on Patentability mailed Aug. 6, 2009 in corresponding PCT Application No. PCT/JP2007/073557.

Supplementary EP Search Report mailed Mar. 3, 2010.

International Search Report for PCT/JP2007/073557, mailed Jan. 15, 2008.

U.S. Appl. No. 12/306,959, filed Dec. 30, 2008, naming Yoshihito Hara et al., as inventors.
U.S. Appl. No. 12/446,071, filed Apr. 17, 2009, naming Yoshihito Hara, as inventor.
U.S. Appl. No. 12/446,099, filed Apr. 17, 2009, naming Mitsunori Imade, as inventor.
U.S. Appl. No. 12/518,719, filed Jun. 11, 2009, naming Tetsuo Kikuchi, as inventor.

U.S. Office Action mailed Dec. 7, 2011 in U.S. Appl. No. 12/306,959.
U.S. Office Action mailed Dec. 27, 2011 in U.S. Appl. No. 12/524,914.
U.S. Final Office Action mailed Jan. 9, 2012 in U.S. Appl. 12/446,071.

* cited by examiner

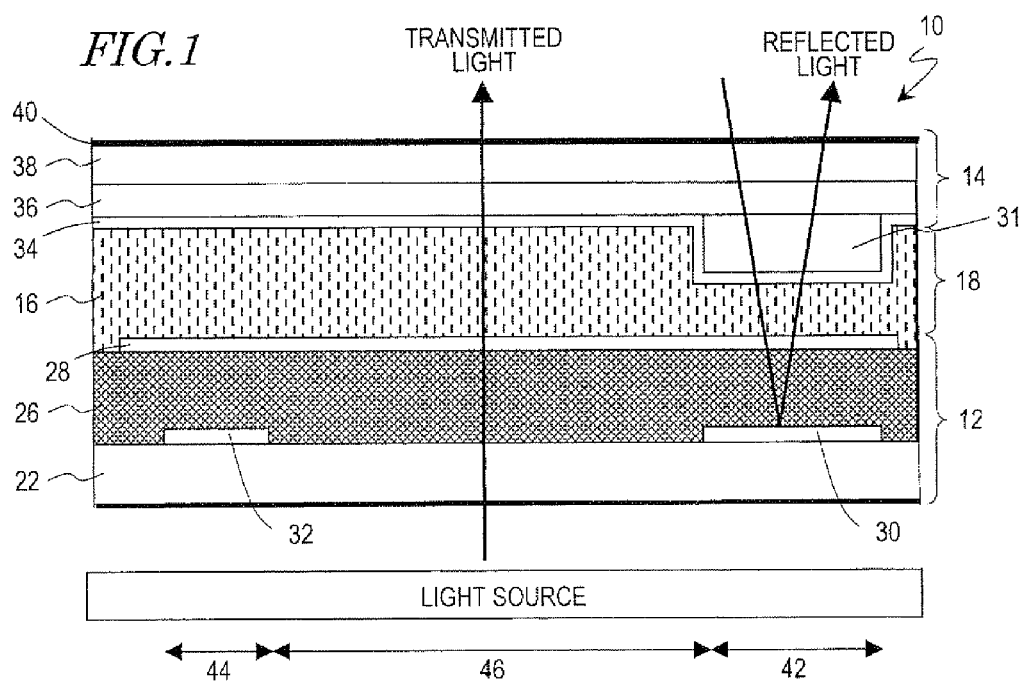
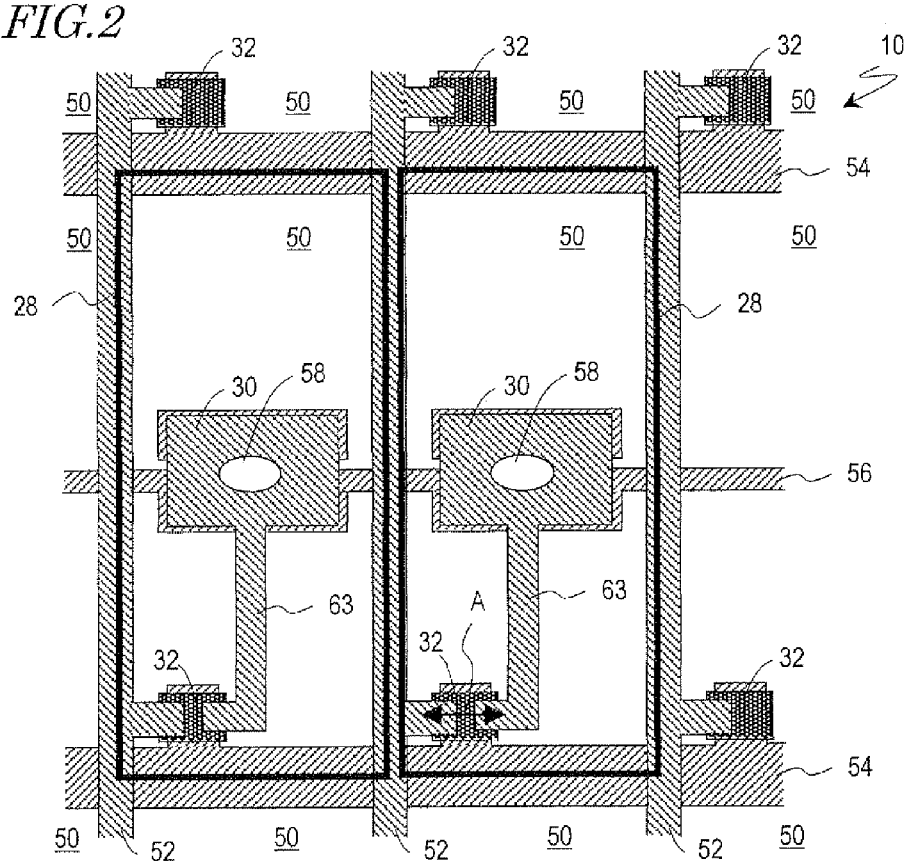

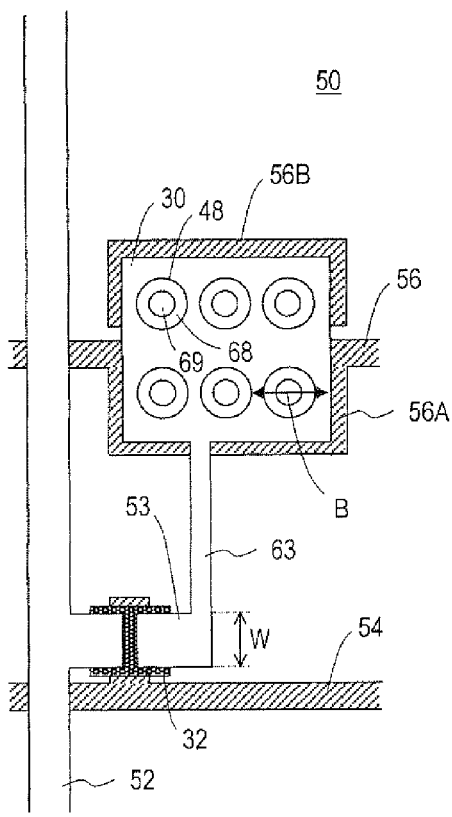
FIG.3
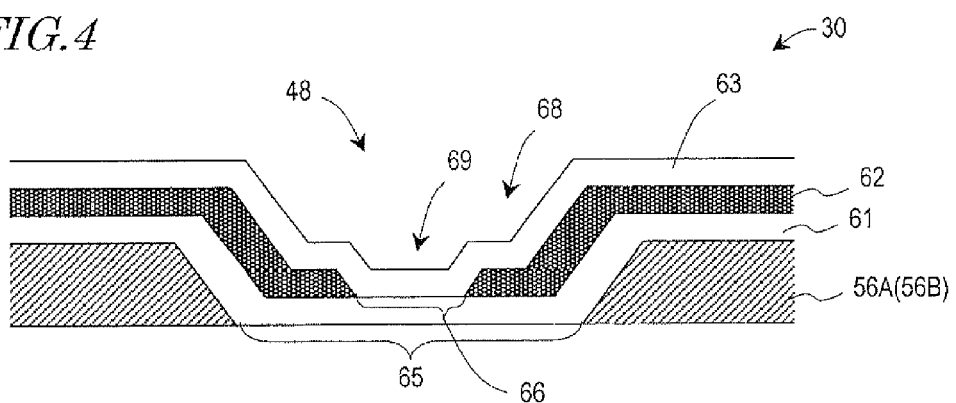
FIG.4
(a)
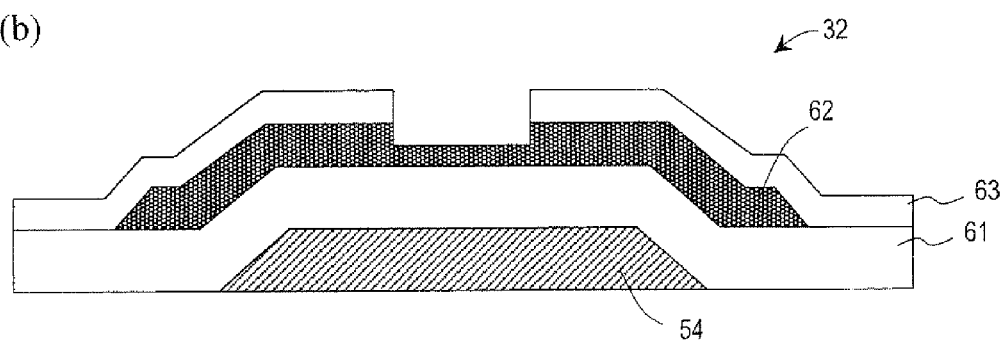
(b)

FIG.5
(a)
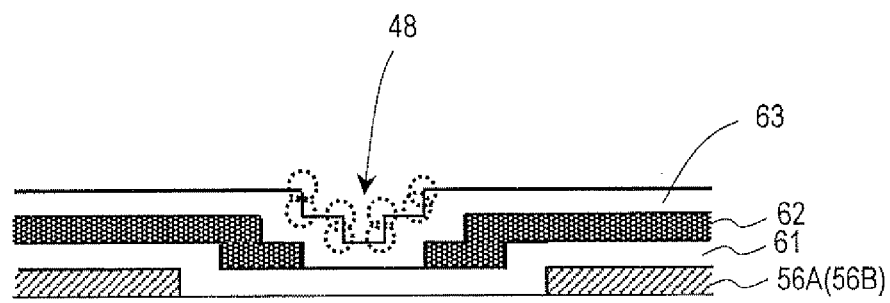
(b)
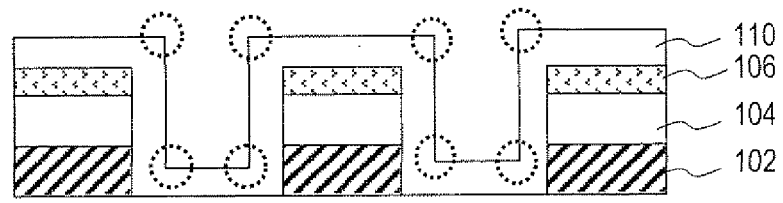
(c)
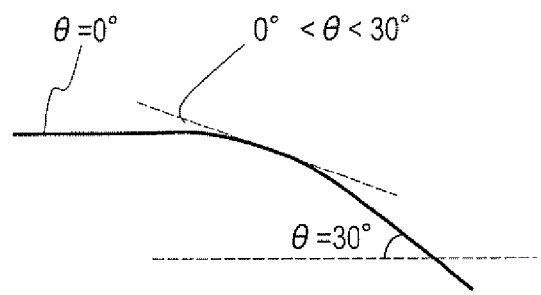

FIG.14
(a)
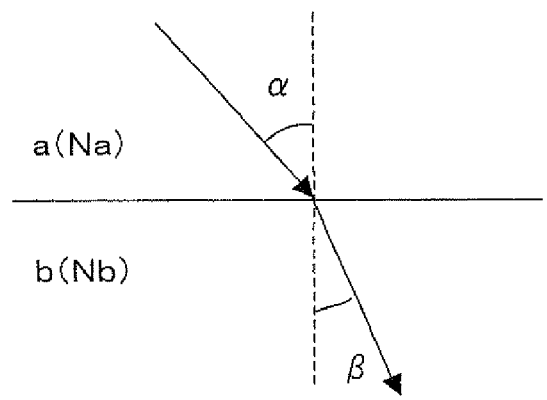
(b)
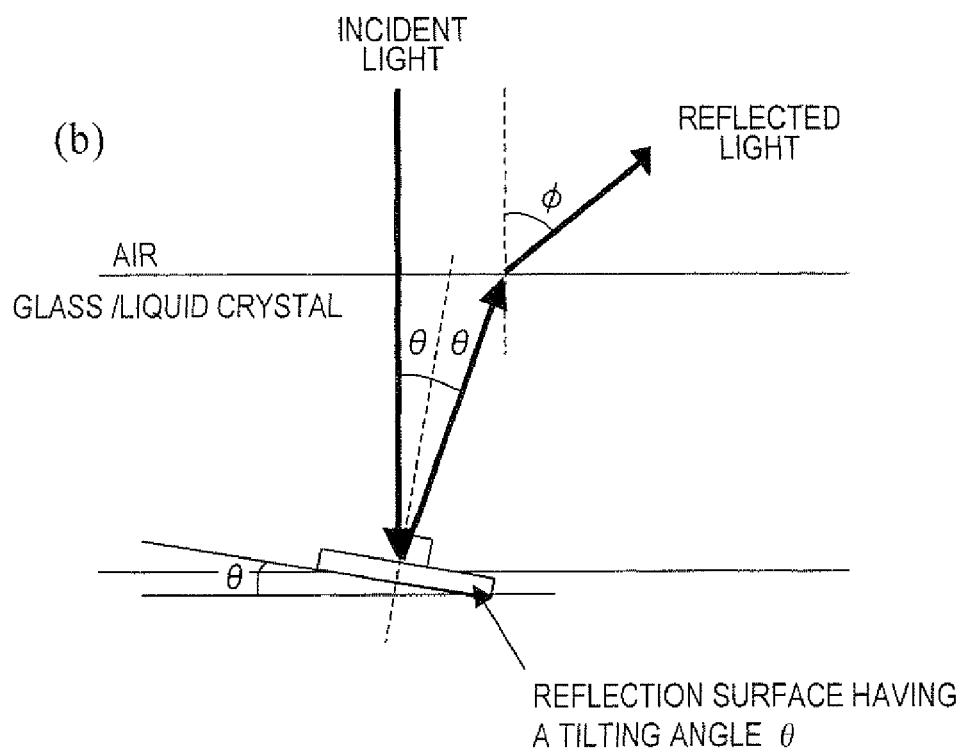

LIQUID CRYSTAL DISPLAY DEVICE

This application is the U.S. national phase of International Application No. PCT/JP2007/073557 filed 6 Dec. 2007, which designated the U.S. and claims priority to JP Application No. 2007-013654 filed 24 Jan. 2007, the entire contents of each of which are hereby incorporated by reference.

TECHNICAL FIELD

The present invention relates to a transflective-type liquid crystal display device which performs display by utilizing reflected light and transmitted light.

BACKGROUND ART

Liquid crystal display devices (LCDs) include the transmission-type liquid crystal display device which utilizes backlight from behind the display panel as a light source for displaying, the reflection-type liquid crystal display device which utilizes reflected light of external light, and the transflective-type liquid crystal display device (reflection/transmission-type liquid crystal display device) which utilizes both reflected light of external light and backlight. The reflection-type liquid crystal display device and the transflective-type liquid crystal display device are characterized in that they have smaller power consumptions than that of the transmission-type liquid crystal display device, and their displayed images are easy to see in a bright place. The transflective-type liquid crystal display device is characterized in that its screen is easier to see than that of the reflection-type liquid crystal display device, even in a dark place.

FIG. 12 is a cross-sectional view showing an active matrix substrate 100 in a conventional reflection-type liquid crystal display device (e.g., Patent Document 1).

As shown in this figure, the active matrix substrate 100 includes an insulative substrate 101, as well as a gate layer 102, a gate insulating layer 104, a semiconductor layer 106, a metal layer 108, and a reflective layer 110, which are stacked on the insulative substrate 101. After being stacked on the insulative substrate 101, the gate layer 102, the gate insulating layer 104, the semiconductor layer 106, and the metal layer 108 are subjected to etching by using one mask, thus being formed so as to have an island-like multilayer structure. Thereafter, the reflective layer is formed on this multilayer structure, whereby a reflection surface 112 having ruggednesses is formed. Although not shown, transparent electrodes, a liquid crystal panel, a color filter substrate (CF substrate), and the like are formed above the active matrix substrate 100.

FIG. 13 is a cross-sectional view of a conventional transflective-type liquid crystal display device (e.g., Patent Document 2).

As shown in the figure, in this conventional transflective-type liquid crystal display device, an interlayer insulating film 204 is formed on a drain electrode of a switching element (TFT) 203, and a galvanic corrosion preventing film 205, a reflection electrode film 206, and an amorphous transparent electrode film 218 are stacked on the interlayer insulating film 204. The region where the reflection electrode film 206 is formed is a reflection region of the transflective-type liquid crystal display device. Ruggednesses are formed in an upper portion of the interlayer insulating film 204 within the reflection region, and conforming to these ruggednesses, ruggednesses are also formed on the galvanic corrosion preventing film 205, the reflection electrode film 206, and the amorphous transparent electrode film 218.

[Patent Document 1] Japanese Laid-Open Patent Publication No. 9-54318

[Patent Document 2] Japanese Laid-Open Patent Publication No. 2005-277402

DISCLOSURE OF INVENTION

Problems to be Solved by the Invention

In the active matrix substrate 100 described in Patent Document 1, portions of the reflective layer 110 are formed so as to reach the insulative substrate 101 in portions where the gate layer 102 and the like are not formed (i.e., portions between the islands, hereinafter referred to as "gap portions"). Therefore, in the gap portions, the surface of the reflection surface 112 is recessed in the direction of the insulative substrate 101, thus forming a plane having deep dents (or recesses).

In the reflection-type liquid crystal display device or the transflective-type liquid crystal display device, in order to perform bright display in a wide viewing angle, it is necessary to allow incident light entering the display device to be more uniformly and efficiently reflected by the reflection surface 112 across the entire display surface, without causing specular reflection in one direction. For this purpose, it is better if the reflection surface 112 has moderate ruggednesses rather than being a complete plane.

However, the reflection surface 112 of the aforementioned active matrix substrate 100 has deep dents. Therefore, light is unlikely to reach the reflection surface located in lower portions of the dents, and even if at all light reaches there, the reflected light thereof is unlikely to be reflected toward the liquid crystal panel, thus resulting in a problem in that the reflected light is not effectively utilized for displaying. Furthermore, many portions of the reflection surface 110 have a large angle with respect to the display surface of the liquid crystal display device, thus resulting in a problem in that so that the reflected light from those portions is not effectively utilized for displaying.

FIG. 14 is a diagram showing a relationship between the tilt of the reflection surface 112 and reflected light. FIG. 14(a) shows a relationship between an incident angle $\alpha$ and an outgoing angle $\beta$ when light enters a medium b having a refractive index Nb from a medium a having a refractive index Na. In this case, according to Snell's Law, the following relationship holds true.

$$Na \times \sin\alpha = Nb \times \sin\beta$$

FIG. 14(b) is a diagram showing a relationship between incident light and reflected light when incident light perpendicularly entering the display surface of a liquid crystal display device is reflected from a reflection surface which is tilted by $\theta$ with respect to the display surface (or the substrate). As shown in the figure, the incident light perpendicularly entering the display surface is reflected from the reflection surface which is tilted by angle $\theta$ with respect to the display surface, and goes out in a direction of an outgoing angle $\phi$.

Results of calculating the outgoing angle $\phi$ according to Snell's Law with respect to each angle $\theta$ of the reflection surface are shown in Table 1.

TABLE 1

| θ | φ | 90 − φ |
|---|---|---|
| 0 | 0 | 90 |
| 2 | 6.006121 | 83.99388 |
| 4 | 12.04967 | 77.95033 |
| 6 | 18.17181 | 71.82819 |
| 8 | 24.42212 | 65.57788 |
| 10 | 30.86588 | 59.13412 |
| 12 | 37.59709 | 52.40291 |
| 14 | 44.76554 | 45.23446 |
| 16 | 52.64382 | 37.35618 |
| 18 | 61.84543 | 28.15457 |
| 20 | 74.61857 | 15.38143 |
| 20.5 | 79.76542 | 10.23458 |
| 20.6 | 81.12757 | 8.872432 |
| 20.7 | 82.73315 | 7.266848 |
| 20.8 | 84.80311 | 5.19888 |
| 20.9 | 88.85036 | 1.149637 |
| 20.905 | 89.79914 | 0.200856 |

The values in this Table are calculated by assuming that air has a refractive index of 1.0 and the glass substrate and the liquid crystal layer have a refractive index of 1.5. As shown in Table 1, when the angle θ of the reflection surface exceeds 20 degrees, the outgoing angle φ becomes very large (i.e., 90-φ becomes very small), so that most of the outgoing light does not reach the user. Therefore, even if ruggednesses are provided on the reflection surface of the reflective layer, in order to effectively utilize reflected light, it must be ensured in more portions of the reflection surface that the angle θ is 20 degrees or less.

Since the reflection surface 112 of the aforementioned active matrix substrate 100 has many portions which are greater than 20 degrees, reflected light is not very effectively used for displaying. In order to solve this problem, it might be possible to form an insulating layer under the reflective layer 110 and form the reflective layer 110 upon this insulating layer. However, in this case, a step of forming an insulating layer and a step of forming contact holes for connecting the reflective layer 110 to the drains of the TFTs in the insulating layer are needed, thus resulting in a problem of an increase in the material and the number of steps.

Moreover, in the transflective-type liquid crystal display device of Patent Document 2, after stacking the interlayer insulating film 204 on the drain electrode 222, a step of forming ruggednesses in an upper portion thereof is needed, and a step of stacking the galvanic corrosion preventing film 205, the reflection electrode film 206, and the amorphous transparent electrode film 218 further thereupon is needed. Thus, the conventional transflective-type liquid crystal display device also has a problem in that the material and number of steps are increased for forming the reflection region.

Furthermore, in a conventional transflective-type liquid crystal display device, ruggednesses are formed on the surface of the amorphous transparent electrode film 218, which is in contact with the liquid crystal layer 211, and therefore the electric field which is formed across the liquid crystal layer 211 is not uniform, thus making it difficult to uniformly control the liquid crystal orientation in a desired direction in the reflection region. Moreover, although a slope which conforms to the end shape of the interlayer insulating film 204 is formed at an end of the amorphous transparent electrode film 218, there is also a problem in that this slope disturbs the orientation of the liquid crystal near the end of the reflection region.

Moreover, in the case where a storage capacitor (Cs) is formed in each pixel of a transflective-type liquid crystal display device, there has also been a problem in that the area of the transmission region is decreased due to the presence of a storage capacitor portion, a storage capacitor line (Cs line), or a TFT, thus resulting in a reduced aperture ratio of the liquid crystal display device. In particular, when a reflection region is to be formed in a storage capacitor portion, for example, trying to obtain a sufficiently broad reflection region will even necessitate an increased storage capacitance. In order to stably supply an electric charge to such a storage capacitor, there exists a problem in that the drain width of the TFT needs to be broadened, whereby a portion of the transmission region would be blocked and the aperture ratio lowered.

The present invention has been made in view of the above problems, and an objective thereof is to provide at low cost a transflective-type liquid crystal display device with a high image quality which has a high aperture ratio and an excellent efficiency of utility of reflected light.

Means for Solving the Problems

A liquid crystal display device according to the present invention is a liquid crystal display device having a plurality of pixels, and comprising, in each of the plurality of pixels, a transistor and a reflection section for reflecting incident light toward a display surface, wherein, the reflection section includes a metal layer, an insulating layer formed on the metal layer, a semiconductor layer formed on the insulating layer, and a reflective layer formed on the semiconductor layer; a plurality of recesses are formed on a surface of the reflective layer; a storage capacitor is formed between at least a portion of the metal layer and at least a portion of the reflective layer; and at least one of the metal layer and the reflective layer includes two portions which are electrically isolated from each other.

In one embodiment, the metal layer includes a first portion and a second portion which are electrically isolated from each other; the first portion of the metal layer is connected to a storage capacitor line; the reflective layer is connected to a drain of the transistor; and the storage capacitor is formed between the first portion of the metal layer and the reflective layer.

In one embodiment, the reflective layer includes a first portion and a second portion which are electrically isolated from each other; the first portion of the reflective layer is connected to a drain of the transistor; the metal layer is connected to a storage capacitor line; and the storage capacitor is formed between the metal layer and the first portion of the reflective layer.

In one embodiment, the metal layer includes a first portion and a second portion which are electrically isolated from each other; the reflective layer includes a first portion and a second portion which are electrically isolated from each other; the first portion of the metal layer is connected to a storage capacitor line; the first portion of the reflective layer is connected to a drain of the transistor; and the storage capacitor is formed between the first portion of the metal layer and the first portion of the reflective layer.

In one embodiment, the plurality of recesses include a first recess and a second recess overlapping the first recess.

In one embodiment, the first recess is formed so as to conform to the shape of the metal layer, and the second recess is formed so as to conform to the shape of the semiconductor layer.

In one embodiment, the metal layer includes an aperture or a recess, and the first recess is formed correspondingly to the aperture or recess in the metal layer.

In one embodiment, the semiconductor layer includes an aperture or a recess, and the second recess is formed correspondingly to the aperture or recess in the semiconductor layer.

in one embodiment, a level difference is formed on side faces of the plurality of recesses.

In one embodiment, the first recess and the second recess are formed based on the shape of an aperture or a recess which is included in at least two layers among the metal layer, the insulating layer, and the semiconductor layer.

In one embodiment, the metal layer, the semiconductor layer, and the reflective layer are formed from same materials as, respectively, a gate electrode, a semiconductor portion, and source and drain electrodes of the transistor.

One embodiment comprises: a liquid crystal layer; and an interlayer insulating layer and a pixel electrode interposed between the liquid crystal layer and the reflective layer, wherein a face of the pixel electrode facing the liquid crystal layer is formed flat without conforming to shapes of the recesses in the reflective layer.

Effects of the Invention

According to the present invention, a transflective-type liquid crystal display device with a high image quality which has a high aperture ratio and an excellent efficiency of utility of reflected light can be provided at low cost.

BRIEF DESCRIPTION OF DRAWINGS

[FIG. 1] A diagram schematically showing a cross-sectional shape of a liquid crystal display device according to the present invention.

[FIG. 2] A plan view showing the construction of pixel regions of a liquid crystal display device according to the present invention.

[FIG. 3] A plan view showing the construction of a pixel according to Embodiment 1.

[FIG. 4] Cross-sectional views showing the construction of a TFT section and a reflection section of Embodiment 1, where (a) shows the construction of a reflection section, and (b) shows the construction of a TFT section.

[FIG. 5] A schematic diagram for comparison of a liquid crystal display device according to the present invention and a conventional liquid crystal display device with respect to their reflection section constructions, where (a) is a diagram showing a cross section of a reflection section according to the present invention, (b) is a diagram showing a cross section of a conventional reflection section, and (c) is a diagram describing surface angles at a corner portion of the reflection section.

[FIG. 14] A diagram showing a relationship between a tilt of a reflection surface and reflected light in a liquid crystal display device, where (a) shows a relationship between an incident angle α and an outgoing angle β when light enters a medium b having a refractive index Nb from a medium a having a refractive index Na, and (b) is a diagram showing a relationship between incident light and reflected light as well as the angle of the display surface of the liquid crystal display device.

Figure 6:
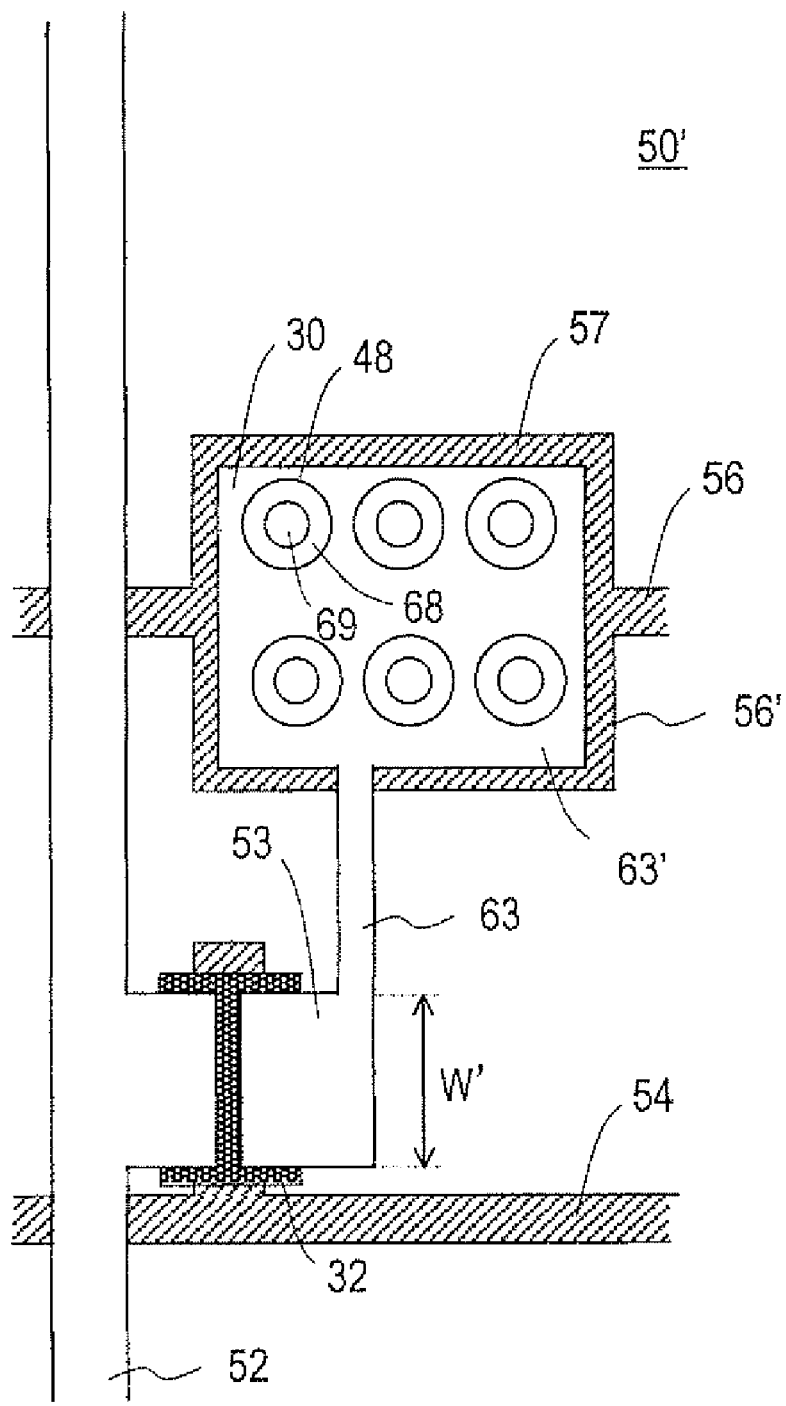
[FIG. 6] A plan view showing a pixel construction of a liquid crystal display device of Reference Example.

| DESCRIPTION OF REFERENCE NUMERALS | |
|---|---|
| 10 | liquid crystal display device |
| 12 | TFT substrate |
| 14 | counter substrate |
| 16 | liquid crystal |
| 18 | liquid crystal layer |
| 22 | transparent substrate |
| 26 | interlayer insulating layer |
| 28 | pixel electrode |
| 30 | reflection section |
| 31 | layer |
| 32 | TFT section |
| 34 | counter electrode |
| 36 | CF layer |
| 38 | transparent substrate |
| 40 | display surface |
| 42 | reflection region |
| 44 | TFT region |
| 46 | transmission region |
| 48 | recess |
| 50, 50' | pixel |
| 52 | source line |
| 53 | drain |
| 54 | gate line |
| 56 | Cs line |
| 56A, 56B, 56C, 56' | Cs metal layer |
| 58 | contact hole |
| 61 | insulating layer |
| 62 | semiconductor layer |
| 63, 63A, 63B, 63' | reflective layer |
| 65, 66 | aperture |
| 68, 69 | recess |
| 100 | active matrix substrate |
| 101 | insulative substrate |
| 102 | gate layer |
| 104 | gate insulating layer |
| 106 | semiconductor layer |
| 108 | metal layer |
| 110 | reflective layer |
| 112 | reflection surface |
| 203 | switching element |
| 204 | interlayer insulating film |
| 205 | galvanic corrosion preventing film |
| 206 | reflection electrode film |
| 211 | liquid crystal layer |
| 218 | amorphous transparent electrode film |
| 222 | drain electrode |

BEST MODE FOR CARRYING OUT THE INVENTION (Embodiment 1)

Hereinafter, with reference to the drawings, a first embodiment of the liquid crystal display device according to the present invention will be described.

FIG. 1 is a diagram schematically showing a cross-sectional shape of a liquid crystal display device 10 of the present embodiment. The liquid crystal display device 10 is a transflective-type liquid crystal display device (LCD) by an active matrix method. As shown in FIG. 1, the liquid crystal display device 10 includes a TFT (Thin Film Transistor) substrate 12, a counter substrate 14 such as a color filter substrate (CF substrate), and a liquid crystal layer 18 containing liquid crystal 16 which is sealed between the TFT substrate 12 and the counter substrate 14.

The TFT substrate 12 includes a transparent substrate 22, an interlayer insulating layer 26, and a pixel electrode 28, and includes reflection sections 30 and TFT sections 32. Note that gate lines (scanning lines), source lines (signal lines), Cs lines (storage capacitor lines), and the like are also formed on the TFT substrate 12, which will be described later.

The counter substrate 14 includes a counter electrode 34, a color filter layer (CF layer) 36, and a transparent substrate 38. The upper face of the transparent substrate 38 serves as a display surface 40 of the liquid crystal display device. Note that although the TFT substrate 12 and the counter substrate 14 each have an alignment film and a polarizer, they are omitted from the figure.

In the liquid crystal display device 10, a region where a reflection section 30 is formed is referred to as a reflection region 42, whereas a region where a TFT section 32 is formed is referred to as a TFT region 44. In the reflection region, light entering from the display surface 40 is reflected by the reflection section 30, and travels through the liquid crystal layer 18 and the counter substrate 14 so as to go out from the display surface 40. Furthermore, the liquid crystal display device 10 has transmission regions 46 which are formed in regions other than the reflection regions 42 and the TFT regions 44. In the transmission regions 46, light which is emitted from a light source in the liquid crystal display device 10 travels through the TFT substrate 12, the liquid crystal layer 18, and the counter substrate 14 so as to go out from the display surface 40.

Note that, by providing a layer 31 made of transmissive resin or the like on the counter substrate 14 side above each reflection section 30 as shown in FIG. 1, it is possible to reduce the thickness of the liquid crystal layer 18 in the reflection region 42 to a half of the thickness of the liquid crystal layer 18 in the transmission region 46. As a result, the optical path length can be made equal between the reflection region 42 and the transmission region 46. Although FIG. 1 illustrates the layer 31 as being formed between the counter electrode 34 and the CF layer 36, the layer 31 may be formed on the face of the counter electrode 34 facing the liquid crystal layer 18.

FIG. 2 is a plan view of a portion of the liquid crystal display device 10, as seen from above the display surface 40. As shown in the figure, a plurality of pixels 50 are disposed in a matrix shape in the liquid crystal display device 10. The aforementioned reflection section 30 and TFT section 32 are formed in each pixel 50, with a TFT being formed in the TFT section 32.

In the border of the pixel 50, source lines 52 extend along the column direction (up-down direction in the figure), and gate lines (also referred to as gate metal layers) 54 extend along the row direction (right-left direction in the figure). In the central portion of the pixel 50, a Cs line 56 extends along the row direction. In the interlayer insulating layer 26 of the reflection section 30, a contact hole 58 for connecting the pixel electrode 28 and the drain electrode of the TFT is formed. Hereinafter, the construction of the pixel 50 will be described more specifically with reference to FIG. 3.

FIG. 3 is a plan view schematically showing the construction of the pixel 50. In this figure, the contact hole 58 is omitted from illustration. As will be described later with reference to FIG. 4, the reflection section 30 includes an insulating layer (also referred to as gate insulating layer) 61 formed on the Cs metal layers (also referred to as metal layers) 56A and 56B, a semiconductor layer 62 formed on the insulating layer 61, and a reflective layer 63 formed on the semiconductor layer 62.

The Cs metal layer (first portion) 56A and the Cs metal layer (second portion or isolated portion) 56B are formed in the same layer as and from the same material as the Cs line 56, and the Cs metal layer 56A is electrically connected to the Cs line 56. The Cs metal layer 56B is formed so as to be electrically isolated from the Cs line 56 and the Cs metal layer 56A.

The reflective layer 63 is connected to a drain 53 of the TFT, so that a storage capacitor (Cs) is formed between the Cs metal layer 56A and the reflective layer 63 thereabove. Herein, the Cs metal layer 56A and the reflective layer 63 thereabove serve as a storage capacitor electrode and a counter electrode. Since the Cs metal layer 56B is not electrically connected to the Cs line 56A, the electrical capacitance between the reflective layer 63 and the Cs metal layer 56B is substantially zero, so that no substantial electrical capacitance is formed therebetween.

As shown in FIG. 3, a plurality of recesses 48 are formed on the surface of the reflective layer 63 in the reflection section 30. Although six recesses 48 are illustrated herein for ease of understanding the construction, more recesses 48 may actually be formed. Moreover, although the plurality of recesses 48 are disposed at an equal interval vertically and laterally in the figure, they do not need to be disposed at an equal interval.

Each recess 48 includes a recess 68 and a recess 69 which is formed inside the recess 68. The recess 68 is formed so as to conform to the shape of a recess or aperture in the Cs metal layer 56A or 56B, whereas the recess 69 is formed so as to conform to the shape of a recess or aperture in the semiconductor layer 62. Note that the recess 69 does not need to be formed inside the recess 68, but the recess 68 may be formed inside the recess 69, or the recess 68 and the recess 69 may be formed so that their ends overlap or intersect.

In the present specification, the recess 68 and the recess 69 will be said to be overlapping in both a configuration in which one of the recess 68 and the recess 69 contains the other and a configuration in which the edges of the recesses overlap or intersect. Thus, since the recess 68 and the recess 69 overlap each other, level differences are formed on a side face of any recess 48 formed on the surface of the reflective layer 63.

Next, with reference to FIG. 4, the construction of the reflection section 30 and the TFT section 32 will be described more specifically.

FIG. 4(a) shows a cross section of the reflection section 30 (a cross section of a portion shown by arrow B in FIG. 3). Although this figure represents a cross section of the recess 48 formed on the Cs metal layer 56A, a cross section of the recess 48 formed on the Cs metal layer 56B also has a similar shape.

As shown in the figure, in the reflection section 30, the Cs metal layer 56A and 56B, the insulating layer 61, the semiconductor layer 62, and the reflective layer 63 are stacked. The semiconductor layer 62 is composed of an intrinsic amorphous silicon layer (Si(i) layer) and an n+ amorphous silicon layer (Si(n$^+$) layer) which is doped with phosphorus, for example.

The Cs metal layer 56A and 56B has an aperture 65, whereas the semiconductor layer 62 has an aperture 66. The aperture 66 is located inside the aperture 65. The recess 68 is formed on the surface of the reflective layer 63 above the aperture 65 of the Cs metal layer 56A and 56B, whereas the recess 69 is formed on the surface of the reflective layer 63 above the aperture 66 of the semiconductor layer 62. Since the recess 68 and the recess 69 overlap, level differences are formed on the inner slope of the recess 48.

The recess 68 is formed by stacking the reflective layer 63 over the aperture 65 of the Cs metal layer, via the insulating layer 61 and the semiconductor layer 62. On the other hand, the recess 69 is formed as a result of forming the reflective layer 63 over the aperture 66 of the semiconductor layer. Note that a recess (dent) may be formed instead of the aperture 65 of the Cs metal layer or the aperture 66 of the semiconductor layer. In that case, the recess 68 and the recess 69 of the reflective layer 63 is to be formed in accordance with that recess (dent) in the Cs metal layer and the semiconductor layer.

By adding a level difference to the side face of the aperture 65 of the Cs metal layer, a level difference may be introduced to the side face of the recess 68 of the reflective layer. Moreover, by adding a level difference to the side face of the aperture 66 of the semiconductor layer 62, a level difference may be introduced to the side face of the recess 69 of the reflective layer. Moreover, by further providing an aperture or a recess in the insulating layer 61, a recess may be formed in the reflective layer. Moreover, instead of the aperture 65 of the Cs metal layer or the aperture 66 of the semiconductor layer, an aperture or a recess may be provided in the insulating layer 61, thereby forming the recess 68 or 69 of the reflective layer. In either case, the recesses 68 and 69 of the reflective layer can be formed based on the shapes of the apertures or the recesses which are included in at least two layers among the Cs metal layer, the insulating layer, and the semiconductor layer.

Instead of forming an aperture or a recess in the Cs metal layer, the insulating layer, or the semiconductor layer, these layers may be formed in island shapes at a recess position. In this case, a plurality of protrusions will be formed in the reflective layer 63 corresponding to these layers which are disposed in island shapes, and a plurality of mutually overlapping recesses having a level difference on the side face will be formed in the neighborhood of these protrusions.

FIG. 4(b) is a diagram showing the construction of the gate metal layer (metal layer) 54, the insulating layer (gate insulating layer) 61, the semiconductor layer 62, and the reflective layer 63 in the TFT section 32, and is a cross-sectional view of a portion at arrow A in FIG. 2. The gate metal layer 54 in the TFT section 32 is formed concurrently with and from the same members as the Cs line 56 and the Cs metal layer 56A and 56B in the reflection section 30. Similarly, the insulating layer 61, the semiconductor layer 62, and the reflective layer 63 in the TFT section 32 are formed concurrently with and from the same members as, respectively, the insulating layer 61, the semiconductor layer 62, and the reflective layer 63 in the reflection section 30. The reflective layer 63 is connected to the drain electrode of the TFT.

Figure 12:
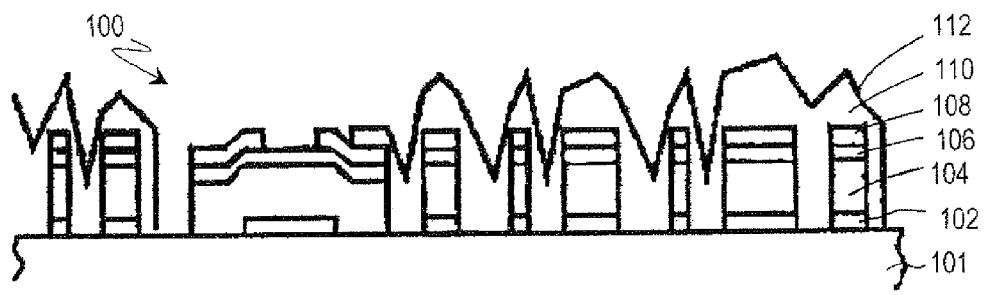
[FIG. 12] A cross-sectional view showing an active matrix substrate of a conventional reflection-type liquid crystal display device.

FIG. 5 is cross-sectional views for structural comparison between the reflection section 30 of Embodiment 1 and the reflection section of the conventional liquid crystal display device shown in FIG. 12. FIG. 5(a) schematically shows the structure of the reflection section 30 of Embodiment 1, and FIG. 5(b) schematically shows the structure of the reflection section of the conventional liquid crystal display device. Note that, in these figures, for simplicity, the slopes of each layer of the reflection section 30 and the slopes of each layer of the conventional liquid crystal display device are illustrated as vertical planes, and the corner portions of each level difference (portions shown by dotted circles in the figure) are illustrated as making perpendicular turns.

As shown in these figures, on the surface of the reflective layer 63 in the reflection section 30 of Embodiment 1, a total of eight corner portions are formed by one recess 48. On the other hand, in the conventional liquid crystal display device, only four corner portions are formed in one recess of the reflection section.

Although these corner portions are illustrated as being perpendicular in FIGS. 5(a) and (b), in an actual corner portion, as shown in FIG. 5(c), a face having angles which are larger than 20 degrees (exemplified as 30 degrees in this figure) with respect to the substrate is continuously formed from a plane (with an angle of 0 degrees) which is parallel to the substrate. Therefore, by forming more recesses in the reflection section, it becomes possible to form more faces (effective reflection surfaces) whose angle with respect to the substrate is 20 degrees or less on the surface of the reflective layer.

Moreover, since the effective reflection surfaces that are formed in a corner portion have various tilting angles which are different from one another, the reflected light will not travel in one fixed direction. Therefore, by forming more recesses, it becomes possible to obtain more reflected light which spans a broad range. Moreover, by increasing the number of recesses and ensuring that the tilting angle of the side face of any recess is 20 degrees or less, more reflected light which spans an even broader range can be obtained.

As shown in FIGS. 5(a) and (b), more corner portions than in the conventional liquid crystal display device are formed in the reflection section 30 of Embodiment 1. This makes it possible to form more effective reflection surfaces on the surface of the reflective layer 63, whereby more light can be reflected toward the display surface across a broad range. Moreover, the recess 48 is formed in accordance with the shapes to which the Cs metal layer and the semiconductor layer are shaped. Therefore, the shapes, depths, the slope tilting angles, and the like of the recess 48 can be easily adjusted during the shaping of the Cs metal layer or the semiconductor layer.

Moreover, the reflective layer 63 which is located inside the recess 48 in Embodiment 1 is formed above the insulating layer 61, or above the insulating layer 61 and the semiconductor layer 62. On the other hand, in the conventional liquid crystal display device, the reflective layer inside the recess is directly formed on the glass substrate, via neither the gate insulating layer nor the semiconductor layer. Therefore, the bottom face of the recess 48 of Embodiment 1 is formed at a position shallower than the bottom face of a recess of the conventional liquid crystal display device. As a result, incident light can be reflected more effectively across a broad range.

In the conventional liquid crystal display device, the bottom face of a recess is formed at a deep position, so that the tilting angle of the recess inner surface is large, which makes it difficult to form a large number of effective reflection surfaces having a tilt of 20 degrees or less within the recess. Moreover, since this recess is formed by forming the gate layer 102, the gate insulating layer 104, and the semiconductor layer 106, and thereafter altogether removing these layers, it has been difficult to increase the effective reflection surface by controlling the tilting angle of the recess inner surface.

In the display device of the present embodiment, a recess in the reflective layer is formed in accordance with the shapes of the Cs metal layer and the semiconductor layer, and therefore the position, size, and shape of the recess can be adjusted when stacking these layers. As a result, the tilt of the recess slope can be controlled, whereby a larger number of effective reflection surfaces with a tilt or 20 degrees or less can be formed, thus allowing more light to be reflected toward the display surface.

Figure 13:
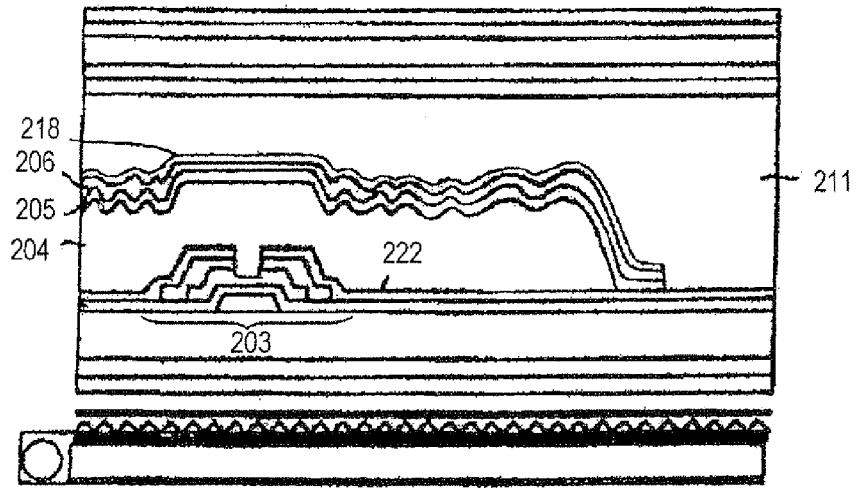
[FIG. 13] A cross-sectional view of a conventional transflective-type liquid crystal display device.

Furthermore, in the liquid crystal display device of the present embodiment, as shown in FIG. 1, the faces of the interlayer insulating layer 26 and the pixel electrode 28 that are on the liquid crystal layer 18 side are formed flat without conforming to the shapes of the recesses of the reflective layer 63, similarly to the face of the counter electrode 34 that is on the liquid crystal layer 18 side. Therefore, as compared to the conventional transflective-type liquid crystal display device shown in FIG. 13, the electric field which is formed across the liquid crystal layer 18 becomes uniform, thus making it possible to uniformly control the orientation of the liquid crystal of the reflection region 42 in a desired direction.

Moreover, since no level differences are formed in the pixel electrode 28 near the ends of the reflection section 30, the liquid crystal orientation is not disturbed. As a result, according to the present embodiment, a liquid crystal display device can be provided which has a high transmittance and excellent viewing angle characteristics, with little display unevenness.

Furthermore, according to the liquid crystal display device of Embodiment 1, advantages which are described below with reference to FIG. 6 can also be obtained.

FIG. 6 is a plan view showing the construction of a pixel 50' of a liquid crystal display device of Reference Example. This liquid crystal display device has a similar construction to that of the liquid crystal display device of Embodiment 1 except as shown in FIG. 6. Moreover, the construction of the pixel 50' is similar to the construction of Embodiment 1 except for the portion described below. Constituent elements which are identical to those of the liquid crystal display device of Embodiment 1 are denoted by like numerals, and the descriptions thereof are omitted.

In the liquid crystal display device of Reference Example, as shown in the figure, a Cs metal layer 56' and a reflective layer 63' in the reflection section 30 are both formed across the entire reflection section 30, and have no electrically isolated portions. Therefore, a storage capacitor is formed by the entire reflective layer 63' and the entire Cs metal layer 56' in the reflection section 30.

In a transflective-type liquid crystal display device, in order to efficiently utilize external light or to obtain a required reflectance according to the manner of use, it is necessary allow the reflection section 30 to have an area of a specific proportion (e.g. corresponding to a reflectance of 3%) relative to the pixel area. However, as in the liquid crystal display device of Reference Example, when a storage capacitor is formed by the reflective layer 63' and the Cs metal layer 56' which span the entire reflection section 30, in order to charge the storage capacitor at a practically suitable speed, the width of the TFT (or the width of the drain of the TFT) W' needs to be set to be relatively broad. This not only reduces the area of the transmission region and lowers the aperture ratio of the pixel, but also induces a deterioration in the production efficiency of the device and an increase in cost.

In the liquid crystal display device of Embodiment 1, as shown in FIG. 3, the Cs metal layer in the reflection section 30 is split into two portions (56A and 56B) which are electrically isolated from each other, and a storage capacitor is formed only of the portion corresponding to the Cs metal layer 56A. Therefore, according to Embodiment 1, while ensuring a required reflectance, a storage capacitor of a necessary size can be obtained. As a result, there is no need to form the size of the TFT or the width W of the TFT to be larger than necessary, whereby the aperture ratio of the pixel can be increased. Furthermore, the production efficiency of the device can be enhanced, and the production cost can be reduced.

Figure 7:
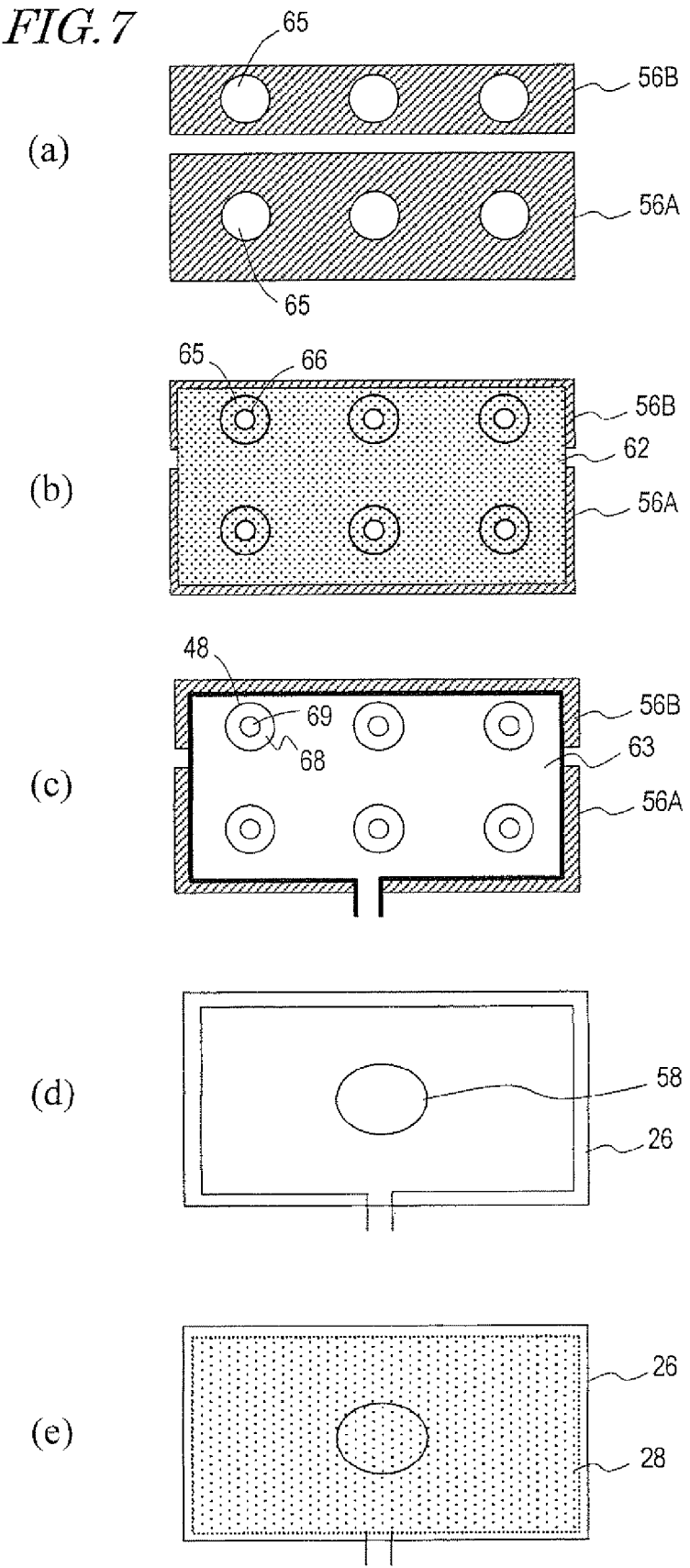
[FIG. 7] Plan views showing a production method for a reflection section of Embodiment 1.

Next, a production method for the TFT substrate 12 will be described with reference to FIG. 7 and FIG. 8. FIG. 7 is plan views showing a production process, in the reflection region 42, for the TFT substrate 12; and FIG. 8 is cross-sectional views showing a production process, in the reflection region 42, for the TFT substrate 12 (a portion shown at arrow B in FIG. 3).

Figure 8:
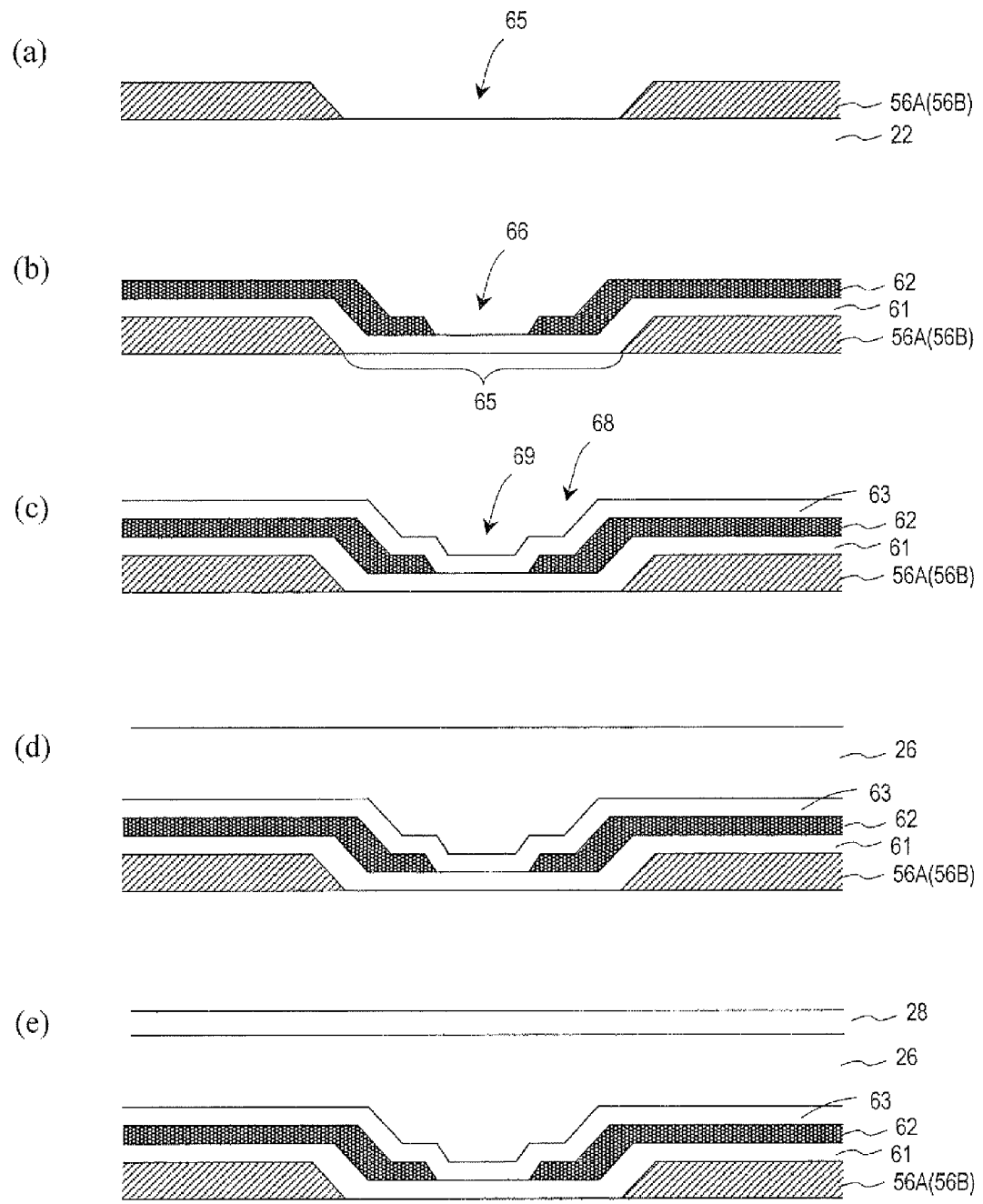
[FIG. 8] Cross-sectional views showing a production method for a reflection section of Embodiment 1.

As shown in FIG. 7($a$) and FIG. 8($a$), first, by a method such as sputtering, a thin metal film of Al (aluminum) is formed on the transparent substrate 22 having been cleaned. Other than Al, this thin metal film may be formed by using Ti (titanium), Cr (chromium), Mo (molybdenum), Ta (tantalum), W (tungsten), or an alloy thereof, etc., or formed from a multilayer body of a layer of such materials and a nitride film.

Thereafter, a resist film is formed on the thin metal film, and after forming a resist pattern through an exposure-development step, a dry or wet etching is performed to form the Cs metal layer 56A and 56B having the apertures 65. The thickness of the Cs metal layer 56A and 56B is 50 to 1000 nm, for example. Note that, although the apertures 65 are illustrated as being formed in the Cs metal layer, a projecting shape of Cs metal layer (or an island-shaped layer) may be formed only at the position of each aperture, by using a resist pattern in which the light shielding portions and the transmitting portions are inverted in the reflection section 30. In this step, the gate line 54 and the Cs line 56 shown in FIG. 2 and the gate metal layer 54 of the TFT section 32 shown in FIG. 4($b$) are also formed concurrently from the same metal.

Next, as shown in FIG. 7($b$) and FIG. 8($b$), by using P-CVD technique and a gaseous mixture of $SiH_4$, $NH_3$, and $N_2$, the insulating layer 61 composed of SiN (silicon nitride) is formed across the entire substrate surface. The insulating layer 61 may also be composed of $SiO_2$ (silicon oxide), $Ta_2O_5$ (tantalum oxide), $Al_2O_3$ (aluminum oxide), or the like. The thickness of the insulating layer 61 is 100 to 600 nm, for example. In this step, the insulating layer 61 of the TFT section 32 shown in FIG. 4($b$) is also formed concurrently.

Next, on the gate insulating layer 61, an amorphous silicon (a-Si) film and an $n^+$a-Si film obtained by doping amorphous silicon with phosphorus (P) are formed. The thickness of the a-Si film is 30 to 300 nm. The thickness of the $n^+$a-Si film is 20 to 100 nm. Thereafter, these films are patterned by photolithography technique and etching technique, whereby the semiconductor layer 62 having the apertures 66 is formed. Herein, the semiconductor layer 62 may be formed only at positions corresponding to the apertures, by using a resist pattern in which the light shielding portions and the transmitting portions are inverted in the reflection section 30. In this step, the semiconductor layer 62 of the TFT section 32 shown in FIG. 4($b$) is also formed concurrently.

Next, as shown in FIG. 7($c$) and FIG. 8($c$), a thin metal film of Al or the like is formed across the entire substrate surface by sputtering technique or the like, thus forming the reflective layer 63. For the thin metal film, the materials which are mentioned above as materials for the Cs metal layer 56 may be used. The thickness of the reflective layer 63 is 30 to 1000 nm or less.

At this time, the recess 68 is formed on the surface of the reflective layer 63 above each aperture 65 in the Cs metal layer 56A and 56B, and the recess 69 is formed on the surface of the reflective layer 63 above each aperture 66 in the semiconductor layer 62. In this step, the reflective layer 63 of the TFT section 32 shown in FIG. 4($b$) is also formed concurrently, and in the TFT section 32, the reflective layer 63 forms a source electrode and a drain electrode of the TFT. Also at this time, the source line 52 in FIG. 2 is also formed as a portion of the reflective layer 63.

Next, as shown in FIG. 7(*d*) and FIG. 8(*d*), a photosensitive acrylic resin is applied by spin-coating, whereby the interlayer insulating layer (interlayer resin layer) 26 is formed. The thickness of the interlayer insulating layer 26 is 0.3 to 5 μm or less. Although a thin film such as $SiN_x$ or $SiO_2$ may be formed by P-CVD technique as a protection film between the reflective layer 63 and the interlayer insulating layer 26, such is omitted from the figure. The thickness of the protection film is 50 to 1000 nm or less. The interlayer insulating layer 26 and the protection film are formed not only on the reflection region 42, but also on the entire upper surface of the transparent substrate 22 including the TFT region 44. Thereafter, through a development process using an exposure apparatus, a contact hole 58 is formed near the center of the reflection section 30.

Next, as shown in FIG. 7(*e*) and FIG. 8(*e*), a transparent electrode film of ITO, IZO, or the like is formed on the interlayer insulating layer 26 by sputtering technique or the like, and this transparent electrode film is subjected to pattern shaping by photolithography technique, whereby the pixel electrode 28 is formed. The pixel electrode 28 is formed not only on the reflection region 42 but also on the entire upper surface of the pixel including the TFT region 44.

In the reflection region 42, the pixel electrode 28 is formed above the interlayer insulating layer 26 and the contact hole 58, such that the metal member of the pixel electrode 28 is in contact with the reflective layer 63 via the contact hole 58. As a result, the drain electrode of the TFT in the TFT section 32 is electrically connected to the pixel electrode 28 via the contact hole 58. In the above step, the upper face of the interlayer insulating layer 26 and the surface of the pixel electrode 28 are formed flat without conforming to the shapes of the recesses 48 in the reflective layer 63.

Preferably, as many recesses 68 and 69 as possible are formed in the reflective layer 63. Therefore, it is preferable that as many apertures in the Cs metal layer and the semiconductor layer as possible are formed, within the limitations of the masks and photoexposure during the production step. The preferable maximum width of each aperture in the Cs metal layer and the semiconductor layer is 2 to 17 μm.

According to the present embodiment, reflected light can be utilized efficiently, and not only a necessary reflectance is ensured but also a higher aperture ratio can be obtained. Furthermore, the production efficiency can be improved, and the production cost can be reduced. Therefore, a liquid crystal display device which is capable of high-quality displaying with a high luminance can be provided inexpensively.

(Embodiment 2)

Hereinafter, a second embodiment of the liquid crystal display device according to the present invention will be described. Constituent elements which are identical to those of Embodiment 1 are denoted by like reference numerals, and the descriptions thereof are omitted.

The liquid crystal display device of the present embodiment basically has the same construction as that of the liquid crystal display device 10 of Embodiment 1 described above, except only for the construction of the Cs metal layer and the reflective layer in the reflection section 30. Therefore, the construction of the reflection section 30 will be mainly described below, while omitting the descriptions of any other portions.

Figure 9:
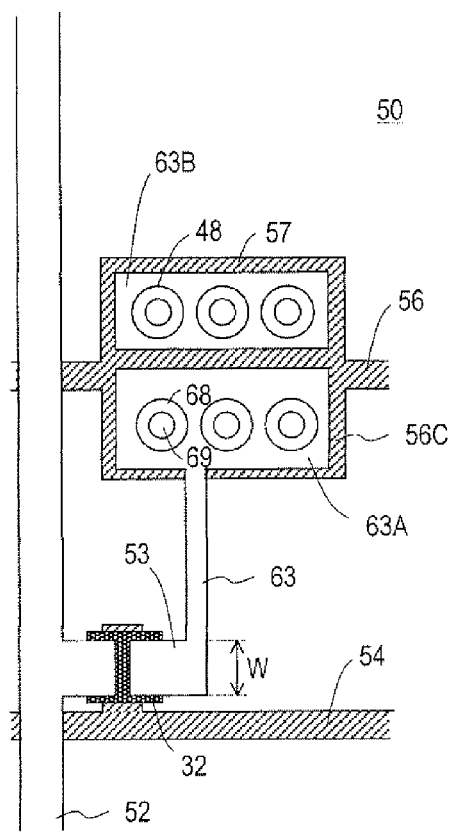
[FIG. 9] A plan view showing a reflection section of a liquid crystal display device according to Embodiment 2.

FIG. 9 is a plan view schematically showing the construction of a pixel 50 of the liquid crystal display device of Embodiment 2. In Embodiment 2, a Cs metal layer 56C is formed across the entire reflection section 30, and as shown in FIG. 4, an insulating layer 61 and a semiconductor layer 62 are formed above the Cs metal layer 56C. On the semiconductor layer 62, a reflective layer (first portion) 63A and a reflective layer (second portion or isolated portion) 63B are formed. The reflective layer 63A is connected to a drain 53 of the TFT, and the reflective layer 63B is electrically isolated from the reflective layer 63A.

The reflective layer 63A and the reflective layer 63B are concurrently formed in the same layers and from the same material. The Cs metal layer 56C is formed in the same layer and from the same material as the Cs line 56 concurrently, and is electrically connected to the Cs line 56. The Cs metal layer 56C and the reflective layer 63A serve as a storage capacitor electrode and a counter electrode, both of which form a storage capacitor (Cs). Since the reflective layer 63B is not electrically connected to the drain 53 of the TFT, no substantial electrical capacitance is formed between the reflective layer 63B and the Cs metal layer 56C.

On the surface of the reflective layers 63A and 63B in the reflection section 30, similarly to Embodiment 1, a plurality of recesses 48 are formed. The structure, formation method, and the like of the recesses 48 and the effects and the like obtained by forming the recesses 48 are as set forth in the descriptions of Embodiment 1. Although not shown in the figure, the contact holes 58 as shown in FIG. 2 are formed in the reflective layer 63A.

In the liquid crystal display device of Embodiment 2, the reflective layer in the reflection section 30 is split into two portions (63A and 63B) which are electrically isolated from each other, and a storage capacitor is formed only of the portion corresponding to the reflective layer 63A. Therefore, according to Embodiment 2, a storage capacitor of a necessary size can be obtained while ensuring a required reflectance, similarly to Embodiment 1. As a result, there is no need to form the TFT to be larger than necessary, whereby the aperture ratio of the pixel can be enhanced. Furthermore, the production efficiency of the device can be enhanced, and the production cost can be reduced.

(Embodiment 3)

Hereinafter, a third embodiment of the liquid crystal display device according to the present invention will be described. Constituent elements which are identical to the constituent elements of Embodiments 1 and 2 are denoted by like reference numerals, and the descriptions thereof are omitted.

The liquid crystal display device of the present embodiment basically has the same construction as that of the liquid crystal display device 10 of Embodiment 1 described above, except only for the construction of the Cs metal layer and the reflective layer in the reflection section 30. Therefore, the construction of the reflection section 30 will be mainly described below, while omitting the descriptions of any other portions.

Figure 10:
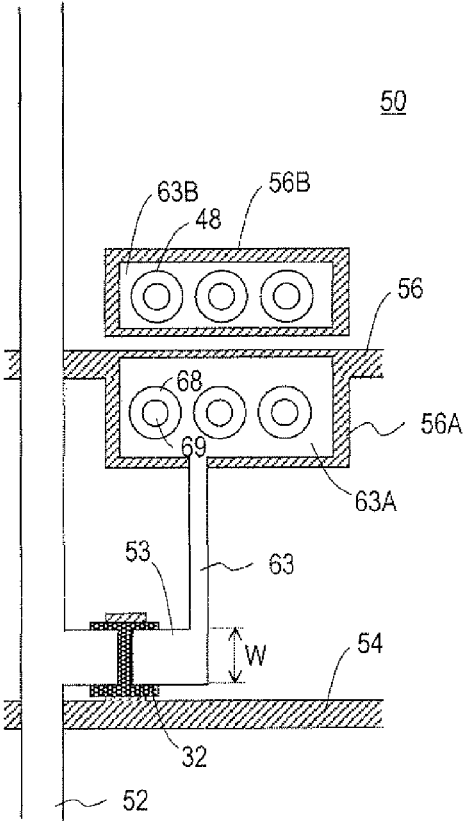
[FIG. 10] A plan view showing a reflection section of a liquid crystal display device according to Embodiment 3.

FIG. 10 is a plan view schematically showing the construction of a pixel 50 of the liquid crystal display device of Embodiment 3. In Embodiment 3, a Cs metal layer 56A and a Cs metal layer 56B which are electrically isolated from each other are formed in the reflection section 30, and an insulating layer 61 and a semiconductor layer 62 are formed above both, as shown in FIG. 4. A reflective layer (first portion) 63A is formed on the semiconductor layer 62 above the Cs metal layer 56A, and a reflective layer (second portion or isolated portion) 63B is formed on the semiconductor layer 62 above the Cs metal layer 56B. The reflective layer 63A and the reflective layer 63B are electrically isolated from each other.

The reflective layer 63A and the reflective layer 63B are concurrently formed in the same layer, and from the same material. The Cs metal layer 56A and the Cs metal layer 56B are formed in the same layer and from the same material as the Cs line 56 concurrently. The Cs metal layer 56A is connected to the Cs line 56, whereas the reflective layer 63A is connected to a drain 53 of the TFT.

The Cs metal layer 56A and the reflective layer 63A serve as a storage capacitor electrode and a counter electrode, both of which form a storage capacitor (Cs). Since the Cs metal layer 56B is not connected to the Cs line 56 and the reflective layer 63B is not electrically connected to the drain 53 of the TFT, no substantial electrical capacitance is formed between the Cs metal layer 56B and the reflective layer 63B.

On the surface of the reflective layers 63A and 63B in the reflection section 30, a plurality of recesses 48 are formed, similarly to Embodiment 1. The structure, formation method, and the like of the recesses 48 and the effects and the like obtained by forming the recesses 48 are as set forth in the descriptions of the Embodiment 1. Although not shown in the figure, the contact holes 58 as shown in FIG. 2 are formed in the reflective layer 63A.

In the liquid crystal display device of Embodiment 3, each of the Cs metal layer and the reflective layer in the reflection section 30 is split into two portions which are electrically isolated from each other, and a storage capacitor is formed only of the Cs metal layer 56A and the reflective layer 63A. Thus, according to Embodiment 3, a storage capacitor of a necessary size can be obtained while ensuring a required reflectance, similarly to Embodiment 1. As a result, there is no need to form the TFT to be larger than necessary, whereby the aperture ratio of the pixel can be enhanced. Furthermore, the production efficiency of the device can be enhanced, and the production cost can be recorded.

(Embodiment 4)

Hereinafter, with reference to the drawings, a fourth embodiment of the liquid crystal display device according to the present invention will be described. Constituent elements which are identical to the constituent elements of Embodiments 1 to 3 are denoted by like reference numerals, and the descriptions thereof are omitted.

Figure 11:
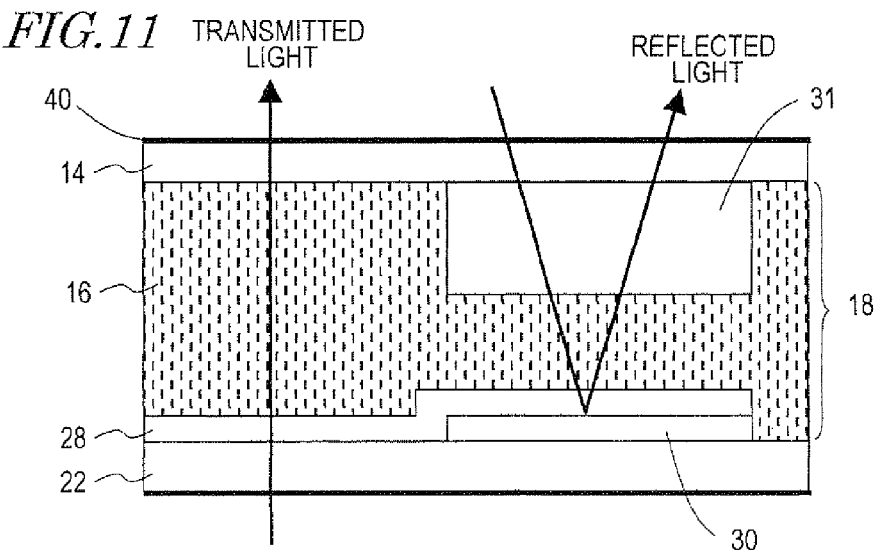
[FIG. 11] A cross-sectional view showing a liquid crystal display device according to Embodiment 4.

FIG. 11 is a diagram schematically showing a cross-sectional shape of the liquid crystal display device of the present embodiment. This liquid crystal display device is based on the liquid crystal display devices of Embodiments 1 to 3 from which the interlayer insulating layer 26 is excluded, and is identical to the liquid crystal display devices of Embodiments 1 to 3 except for the points discussed below. Note that, in FIG. 11, the detailed structure of the counter substrate 14 and the TFT section 32 are omitted from illustration.

As shown in the figure, in Embodiment 4, no interlayer insulating layer 26 is formed, and therefore the pixel electrode 28 is formed upon the reflective layer 63 in the reflection section 30 and the TFT section 32, via an insulative film not shown. The structure and production method for the reflection section 30 and the TFT section 32 are the same as those which were described in Embodiment 1 except that the interlayer insulating layer 26 is eliminated. The pixel layout and wiring structure in the display device are also similar to what is shown in FIG. 2. Also with the construction of Embodiment 4, similarly to Embodiments 1 to 3, the effective reflection surface of the reflective layer is expanded in area, so that more light can be reflected toward the display surface, and the aperture ratio of the transmission region can be increased.

Embodiments 1 to 4 illustrate that the apertures in the Cs metal layer and the semiconductor layer and the recesses in the reflective layer are circular, but they may be formed into ellipses, polygons such as triangles or rectangles, or formed into various shapes such as apertures or recesses with saw-toothed edges, or combinations thereof.

As has been illustrated by the above Embodiments, a liquid crystal display device according to the present invention includes a large number of level differences and corner portions on the surface of a reflective layer, as well as a large number of slopes with a tilting angle of 20 degrees or less, and therefore acquires reflection regions with broad effective reflection surfaces and excellent scattering characteristics. Moreover, since the shape of the reflective layer surface is not likely to have symmetry, occurrence of moiré and coloration due to interference of reflected light can be reduced or prevented. Thus, a liquid crystal display device having a high brightness and being capable of clear displaying can be provided.

Moreover, since the level differences and corner portions on the reflection surface are formed in accordance with the shapes of the Cs metal layer and the semiconductor layer just when they are shaped, reflection regions having excellent reflection characteristics can be easily obtained without increasing the production steps. Furthermore, since the liquid crystal display device according to the present invention is formed by the above-described production method, it can be produced with the same material and the same steps as those of a transmission-type liquid crystal display device. Therefore, a high-quality liquid crystal display device can be provided inexpensively.

Furthermore, according to the present invention, the face of a pixel electrode facing the liquid crystal layer is formed flat, similarly to its face on the counter electrode side, and no level difference is formed in the pixel electrode near the end of the reflection section, thus making it possible to uniformly control the orientation of liquid crystal in a desired direction. Therefore, it is possible to provide a liquid crystal display device which has a high transmittance, excellent viewing angle characteristics, and little display unevenness.

Moreover, according to the present invention, while ensuring a necessary reflectance, the storage capacitors can be reduced to an appropriate size, and thus the TFTs can be formed to be smaller. Therefore, the transmission regions can be increased in area, whereby the aperture ratio of the liquid crystal display device can be increased. This makes possible a high-quality displaying with a higher luminance.

The liquid crystal display device according to the present invention encompasses display apparatuses, television sets, mobile phones, etc., in which a liquid crystal panel is utilized.

Industrial Applicability

According to the present invention, a transflective-type liquid crystal display device having a high image quality can be provided inexpensively. Liquid crystal display devices according to the present invention are suitably used for various transflective-type liquid crystal display devices, e.g., mobile phones, onboard display devices such as car navigation systems, display devices of ATMs and vending machines, etc., portable display devices, laptop PCs, and the like.

The invention claimed is:

1. A liquid crystal display device comprising:
   gate lines, source lines, and a plurality of pixels, and comprising, in each of the plurality of pixels, a transistor and a reflection section for reflecting incident light toward a display surface, wherein,
   the reflection section includes a metal layer, an insulating layer formed on the metal layer, a semiconductor layer formed on the insulating layer, and a reflective layer formed on the semiconductor layer;
   the metal layer is electrically connected to neither the gate lines nor the source lines;

a plurality of recesses are formed on a surface of the reflective layer;

a storage capacitor is formed between at least a portion of the metal layer and at least a portion of the reflective layer; and at least one of the metal layer and the reflective layer includes two portions which are electrically isolated from each other.

2. The liquid crystal display device of claim 1, wherein, the metal layer includes a first portion and a second portion which are electrically isolated from each other;

the first portion of the metal layer is connected to a storage capacitor line;

the reflective layer is connected to a drain of the transistor; and the storage capacitor is formed between the first portion of the metal layer and the reflective layer.

3. The liquid crystal display device of claim 1, wherein, the reflective layer includes a first portion and a second portion which are electrically isolated from each other;

the first portion of the reflective layer is connected to a drain of the transistor;

the metal layer is connected to a storage capacitor line; and the storage capacitor is formed between the metal layer and the first portion of the reflective layer.

4. The liquid crystal display device of claim 1, wherein, the metal layer includes a first portion and a second portion which are electrically isolated from each other;

the reflective layer includes a first portion and a second portion which are electrically isolated from each other;

the first portion of the metal layer is connected to a storage capacitor line;

the first portion of the reflective layer is connected to a drain of the transistor; and the storage capacitor is formed between the first portion of the metal layer and the first portion of the reflective layer.

5. The liquid crystal display device of claim 1, wherein the plurality of recesses include a first recess and a second recess overlapping the first recess.

6. The liquid crystal display device of claim 5, wherein the first recess is formed so as to conform to the shape of the metal layer, and the second recess is formed so as to conform to the shape of the semiconductor layer.

7. The liquid crystal display device of claim 5, wherein the metal layer includes an aperture or a recess, and the first recess is formed correspondingly to the aperture or recess in the metal layer.

8. The liquid crystal display device of claim 5, wherein the semiconductor layer includes an aperture or a recess, and the second recess is formed correspondingly to the aperture or recess in the semiconductor layer.

9. The liquid crystal display device of claim 5, wherein a level difference is formed on a side face of the plurality of recesses.

10. The liquid crystal display device of claim 5, wherein the first recess and the second recess are formed based on the shape of an aperture or a recess which is included in at least two layers among the metal layer, the insulating layer, and the semiconductor layer.

11. The liquid crystal display device of claim 1, wherein the metal layer, the semiconductor layer, and the reflective layer are formed from same materials as, respectively, a gate electrode, a semiconductor portion, and source and drain electrodes of the transistor.

12. The liquid crystal display device of claim 1, comprising: a liquid crystal layer; and an interlayer insulating layer and a pixel electrode interposed between the liquid crystal layer and the reflective layer, wherein a face of the pixel electrode facing the liquid crystal layer is formed flat without conforming to shapes of the recesses in the reflective layer.

13. The liquid crystal display device of claim 1, wherein the metal layer is a Cs metal layer.

14. The liquid crystal display device of claim 1, wherein the metal layer and a drain of the transistor in a given pixel are formed in different layers.

15. The liquid crystal display device of claim 1, wherein the metal layer includes two portions in the given pixel which are (i) electrically isolated from each other, and (ii) not electrically connected to the gate or source lines.

16. The liquid crystal display device of claim 1, wherein the reflective layer includes two portions in the given pixel which are (i) electrically isolated from each other, and (ii) not electrically connected to the gate or source lines.

* * * * *